United States Patent
Watanabe et al.

(10) Patent No.: US 9,346,126 B2
(45) Date of Patent: May 24, 2016

(54) LASER PROCESSING HEAD, LASER PROCESSING APPARATUS, OPTICAL SYSTEM OF LASER PROCESSING APPARATUS, LASER PROCESSING METHOD, AND LASER FOCUSING METHOD

(75) Inventors: Masao Watanabe, Tokyo (JP); Shuho Tsubota, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 267 days.

(21) Appl. No.: 13/982,790

(22) PCT Filed: May 30, 2011

(86) PCT No.: PCT/JP2011/062391
§ 371 (c)(1),
(2), (4) Date: Jul. 31, 2013

(87) PCT Pub. No.: WO2012/164663
PCT Pub. Date: Dec. 6, 2012

(65) Prior Publication Data
US 2013/0306609 A1 Nov. 21, 2013

(51) Int. Cl.
*B23K 26/06* (2014.01)
*B23K 26/073* (2006.01)
(Continued)

(52) U.S. Cl.
CPC ......... *B23K 26/0648* (2013.01); *B23K 26/0665* (2013.01); *B23K 26/0734* (2013.01); *B23K 26/38* (2013.01); *G02B 27/40* (2013.01)

(58) Field of Classification Search
CPC ........... B23K 26/0648; B23K 26/0665; B23K 26/0734; B23K 26/38; G02B 27/40
See application file for complete search history.

(56) References Cited

U.S. PATENT DOCUMENTS 5,352,495 A * 10/1994 Henderson et al. ............ 427/596
5,886,318 A * 3/1999 Vasiliev et al. .......... 219/121.69
(Continued)

FOREIGN PATENT DOCUMENTS

JP 07-214360 A * 8/1995
JP 9-108879 4/1997
(Continued)

OTHER PUBLICATIONS

Machine translation of Japan Patent No. 2005-257,735, Jun. 2015.*
(Continued)

*Primary Examiner* — Geoffrey S Evans
(74) *Attorney, Agent, or Firm* — Wenderoth, Lind & Ponack, L.L.P.

(57) ABSTRACT

A laser cutting apparatus (10) includes a laser processing head (15) that receives a laser beam emitted by a laser oscillator (12) and that uses a spherical lens for converging the laser beam so as to cause the intensity distribution of the laser beam to have a caldera-like shape, in which the intensity of the laser beam is higher in a peripheral area than in a central area, at the position of a workpiece (20). Moreover, the laser processing head (15) radiates the laser beam whose focal position is displaced from the position of the workpiece (20) to the workpiece (20). Therefore, the laser cutting apparatus (10) performs an inversion on the laser beam by using the spherical aberration of the spherical lens. Consequently, with a simple configuration, a laser beam whose inner area and outer area are inverted at the position of the workpiece (2) can be generated, and the processing direction for processing the workpiece (20) is not limited.

11 Claims, 9 Drawing Sheets

(51) Int. Cl.
*B23K 26/38* (2014.01)
*G02B 27/40* (2006.01)

(56) References Cited

U.S. PATENT DOCUMENTS

| | | | |
|---|---|---|---|
| 6,307,176 | B1 | 10/2001 | Kurahashi et al. |
| 7,847,213 | B1* | 12/2010 | Anikitchev ............... 219/121.61 |
| 2003/0179452 | A1* | 9/2003 | Lizotte .......................... 359/566 |
| 2007/0140092 | A1* | 6/2007 | Frangineas ........ G02B 27/0927 369/112.18 |
| 2007/0145024 | A1* | 6/2007 | Salama .............. B23K 26/0734 219/121.71 |
| 2009/0084755 | A1* | 4/2009 | Salama ................ H05K 3/0035 216/18 |
| 2010/0086741 | A1* | 4/2010 | Bovatsek et al. ............. 428/156 |
| 2010/0288740 | A1 | 11/2010 | Komiya et al. |
| 2014/0131327 | A1* | 5/2014 | Nishitani ........... B23K 26/0648 219/121.63 |

FOREIGN PATENT DOCUMENTS

| | | | |
|---|---|---|---|
| JP | 11-254160 A | * | 9/1999 |
| JP | 2003-236690 A | * | 8/2003 |
| JP | 2003-305581 | | 10/2003 |
| JP | 2005-257735 | | 9/2005 |
| JP | 2006-035303 A | * | 2/2006 |
| JP | 2007-029990 A | * | 2/2007 |
| JP | 2008-139476 | | 6/2008 |
| JP | 2009-208092 | | 9/2009 |
| JP | 2011-31283 | | 2/2011 |

OTHER PUBLICATIONS

Chang et al. "An extraordinary episode of Yellowstone caldera uplift,2004-2010, from GPS and InSAR observations", Dec. 2010, Geophysical Research letters, Vo. 37,L23302, pp. 1-6.*
Machine translation of Japan Patent document No. 7-214,360, Jan. 2016.*
Machine translation of Japan Patent document No. 11-254,160, Jan. 2016.*
Machine translation of Japan Patent document No. 2003-236,690-A, Aug. 2003.*
Extended European Search Report issued Feb. 9, 2015 in corresponding European patent application No. 11 86 6675.
International Search Report mailed Aug. 16, 2011 in International (PCT) Application No. PCT/JP2011/062391.
Written Opinion of the International Searching Authority mailed Aug. 16, 2011 in International (PCT) Application No. PCT/JP2011/062391.
Decision to Grant a Patent issued Jul. 22, 2014 in corresponding Japanese patent application No. 2013-517726.
Communication under Rule 71(3) EPC issued Feb. 2, 2016 in European patent application No. 11866675.9.

* cited by examiner

FIG. 6
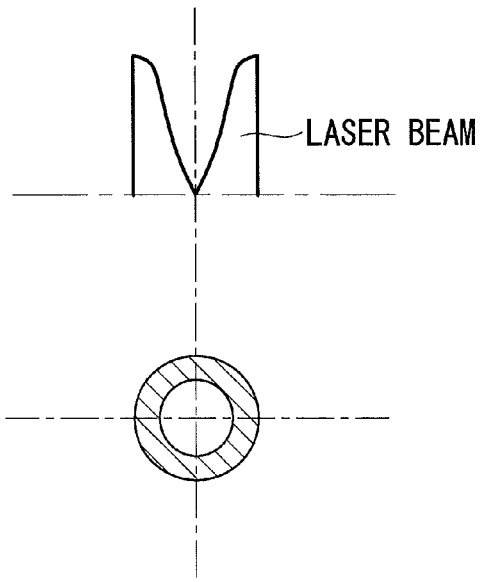
(A)
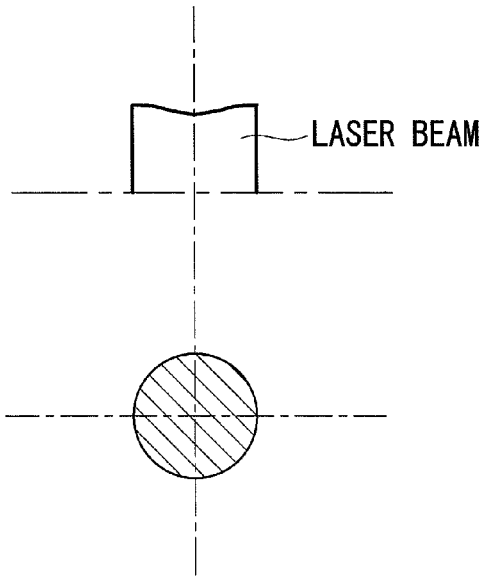
(B)
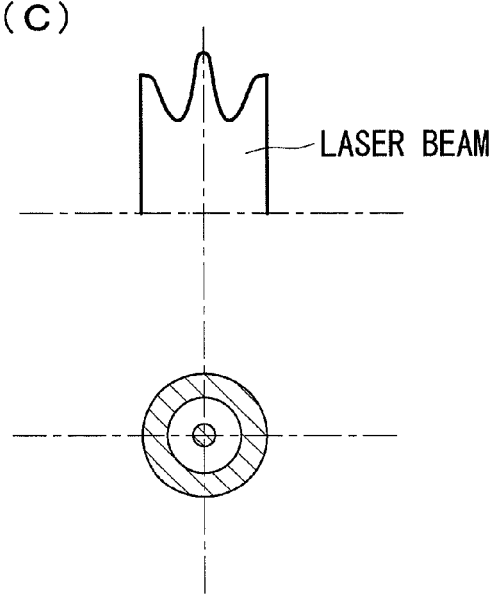
(C)

FIG. 7
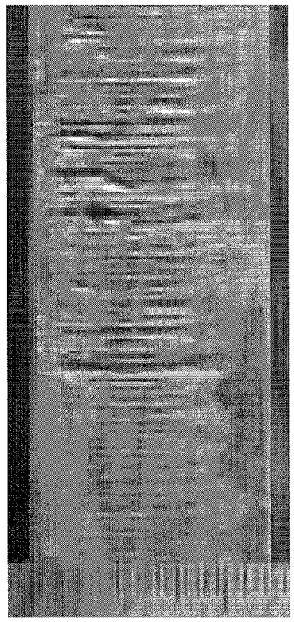
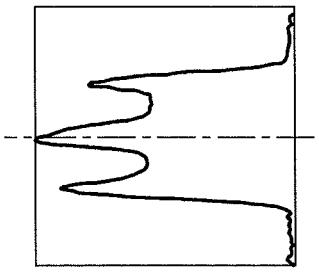
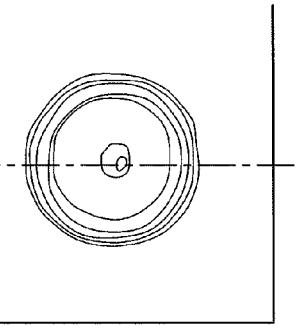
(A)
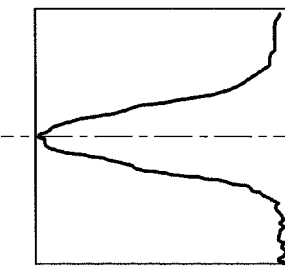
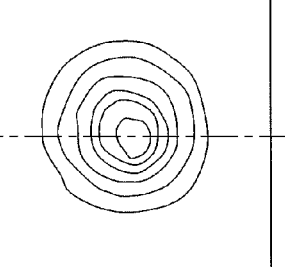
(B)

LASER PROCESSING HEAD, LASER PROCESSING APPARATUS, OPTICAL SYSTEM OF LASER PROCESSING APPARATUS, LASER PROCESSING METHOD, AND LASER FOCUSING METHOD

TECHNICAL FIELD

The present invention relates to laser processing heads, laser processing apparatuses, optical systems of laser processing apparatuses, laser processing methods, and laser focusing methods.

BACKGROUND ART

In recent years, laser cutting apparatuses that transmit laser beams from laser oscillators to processing heads, which process workpieces composed of metal or an alloy, via optical fibers so as to cut the workpieces by using the laser beams have been developed. A laser that uses such an optical fiber transmits a solid-state laser beam (such as a fiber laser beam, a disk laser beam, or a semiconductor laser beam) via the optical fiber.

In the related art, because the converging ability of a YAG laser beam or a semiconductor laser beam transmittable through an optical fiber is low, a $CO_2$ laser has been used for processing a workpiece. However, fiber lasers require less electrical energy for generating a laser beam than $CO_2$ lasers and readily achieve the same or higher beam quality (i.e., the converging ability and linearity of the laser beam), as well as high output. Therefore, fiber lasers are becoming more and more popular.

In order to obtain a laser beam with a small converging spot and a large focal depth, Patent Literature 1 discusses a converging optical system that converges a laser beam generated by a laser light source with a desired focal depth. This converging optical system is configured to generate spherical aberration.

A laser beam tends to have higher quality (i.e., higher linearity) in the central area thereof than in a peripheral area thereof, and the quality decreases with increasing distance from the central area. Therefore, when a workpiece is being cut, the low-quality laser beam in the peripheral area is in contact with the cut edges of the workpiece, thus affecting the cutting quality (such as the cutting precision and the roughness).

In particular, when performing a process for cutting metal, including an alloy, by using a YAG laser beam (in the 1 μm band), it is sometimes not possible to cut a thick metal plate (with a thickness of several millimeters, for example, 8 mm or more). Even if cutting is possible, the quality is not as high as that in a cutting process using a $CO_2$ laser beam (in the 10 μm band) in the related art.

Patent Literature 2 discusses a laser processing apparatus that uses an inversion optical system equipped with two pairs of cylindrical lenses so as to invert an inner area and an outer area of the energy density distribution, which has a Gaussian distribution in the cross section of the laser beam, relative to a plane including an optical axis of the laser beam. The pair of cylindrical lenses disposed at the upstream side in the traveling direction of the laser beam includes two identical cylindrical lenses that are arranged parallel to each other and joined together and separates the laser beam into two beams. The pair of cylindrical lenses disposed at the downstream side includes two cylindrical lenses that are arranged parallel to each other with a distance therebetween and collimates the two laser beams separated by the upstream pair of cylindrical lenses before making the laser beams enter a converging lens.

CITATION LIST

Patent Literature

{PTL 1}
Japanese Unexamined Patent Application, Publication No. 2008-139476
{PTL 2}
Japanese Unexamined Patent Application, Publication No. Hei 9-108879

SUMMARY OF INVENTION

Technical Problem

Because the laser processing apparatus discussed in Patent Literature 2 above inverts the inner area and the outer area of the energy density distribution having a Gaussian distribution relative to the plane including the optical axis of the laser beam, a high-quality laser beam comes into contact with a workpiece. However, since the inner area and the outer area are inverted by separating the laser beam into two beams, the cross section of the laser beam at the position of the workpiece is not circular. Thus, the workpiece can only be processed in the direction in which the laser beam comes into contact with the workpiece. In other words, in the laser processing apparatus discussed in Patent Literature 2, the direction in which the workpiece can be processed is limited.

Furthermore, in the laser processing apparatus discussed in Patent Literature 2, the inner area and the outer area are inverted by separating the laser beam into two beams by using the two pairs of cylindrical lenses, and the laser beams are subsequently converged onto a single spot on the workpiece by the converging lens. Therefore, the optical system has an extremely complicated configuration, and it is necessary to align the optical axis of the pre-separated laser beam and the optical axes of the two separated laser beams, as well as to focus the two separated laser beams onto the same position on the workpiece. Thus, the optical-axis alignment is extremely difficult.

The present invention has been made in view of such circumstances, and an object thereof is to provide a laser processing head, a laser processing apparatus, an optical system of a laser processing apparatus, a laser processing method, and a laser focusing method in which a laser beam whose inner area and outer area are inverted at the position of a workpiece can be generated with a simple configuration and in which the processing direction for processing the workpiece is not limited.

Solution to Problem

In order to solve the aforementioned problems, a laser processing head, a laser processing apparatus, an optical system of a laser processing apparatus, a laser processing method, and a laser focusing method according to the present invention employ the following solutions.

Specifically, a laser processing head according to the present invention is included in a laser processing apparatus that processes a workpiece by irradiating the workpiece with a laser beam. In the laser processing head, at least one of a spherical lens and an aspherical lens capable of generating spherical aberration, which are provided for converging the laser beam, causes an intensity distribution of the laser beam to have a caldera-like shape, in which the intensity of the laser beam is higher in a peripheral area than in a central area, at a position of the workpiece, and the laser beam whose focal position is displaced from the position of the workpiece is radiated onto the workpiece.

According to the present invention, at least one of the spherical lens and the aspherical lens that are provided for converging the laser beam causes the intensity distribution of the laser beam to have a caldera-like shape, in which the intensity of the laser beam is higher in the peripheral area than in the central area, at the position of the workpiece, and the laser beam whose focal position is displaced from the position of the workpiece is radiated onto the workpiece.

By causing the intensity distribution of the laser beam to have a caldera-like shape in which the intensity is higher in the peripheral area than in the central area, the intensity at the side surface of the laser beam coming into contact with the workpiece when processing the workpiece is increased, thereby allowing for higher processing accuracy.

The intensity distribution can be formed into a caldera-like shape in this manner by inverting the central area and the peripheral area of the laser beam by using the spherical lens having spherical aberration or by using the aspherical lens that has not sufficiently undergone aberration correction (i.e., that is capable of generating spherical aberration). In order to perform the inversion, the focal position of the laser beam needs to be displaced from the position of the workpiece. A laser beam has higher quality, that is, higher linearity, in the central area thereof than in the peripheral area thereof. Therefore, the peripheral area of the laser beam after undergoing the inversion can maintain its beam diameter over a long distance (focal depth) due to having high linearity, thereby allowing for high-quality processing of a thick workpiece.

Accordingly, in the present invention, an inversion is performed on the laser beam by utilizing the spherical aberration of at least one of the spherical lens and the aspherical lens, and the laser beam is focused into a circular shape. Consequently, with a simple configuration, a laser beam whose inner area and outer area are inverted at the position of the workpiece can be generated, and the processing direction for processing the workpiece is not limited.

In the above configuration, the intensity distribution of the laser beam at the position of the workpiece is preferably ring-shaped.

Accordingly, the laser beam at the rear side of the workpiece in the processing direction contributes to an increase in temperature of molten metal. As a result, the laser beam can sufficiently increase the temperature of the molten metal, thereby allowing for cutting of a thick workpiece.

In the above configuration, the intensity distribution of the laser beam at the position of the workpiece is preferably non-ring-shaped.

Accordingly, the temperature of the molten metal generated by the processing can be increased uniformly. As a result, the laser beam can sufficiently increase the temperature of the molten metal, thereby allowing for cutting of a thick workpiece. The term "non-ring shape" is, for example, a circular shape with high intensity in both the peripheral area and the central area and refers to a state where the intensity distribution of the laser beam after undergoing the inversion is more uniform as compared to that having a ring shape.

In the above configuration, the intensity distribution of the laser beam at the position of the workpiece preferably has a peak in the central area.

Accordingly, since the intensity distribution has a peak in the central area, a larger amount of heat is applied to the molten metal so that the temperature of the molten metal can be sufficiently increased, thereby allowing for cutting of a thick workpiece.

In the above configuration, the laser beam preferably has a focal depth of 1 mm or more at the position of the workpiece.

A laser beam has higher quality, that is, higher linearity, in the central area thereof than in the peripheral area thereof. Therefore, the peripheral area of the laser beam after undergoing the inversion has a large focal depth at the position of the workpiece due to having high linearity, thereby allowing for high-quality processing of a thick workpiece.

By setting the focal depth of the laser beam to 1 mm or more, the energy density within the thickness of the workpiece can be prevented from decreasing, thereby allowing for higher quality processing.

In the above configuration, the steepness of a side surface of the intensity distribution of the laser beam is preferably 10% or more higher in the laser beam when having the caldera-like shape than in the laser beam prior to having the caldera-like shape.

Accordingly, a laser beam with higher quality is located at the side surface, thereby allowing for higher quality processing.

In the above configuration, the spherical lens preferably includes a converging lens located upstream in a traveling direction of the laser beam and a concave lens located downstream of the converging lens in the traveling direction of the laser beam. Moreover, it is preferable that a positional relationship between the focal position of the laser beam and a position where the intensity distribution of the laser beam becomes the caldera-like shape be adjustable by changing at least one of the curvature of the converging lens and the curvature of the concave lens.

Accordingly, by changing the curvature of the converging lens located upstream in the traveling direction of the laser beam and the curvature of the concave lens located downstream of the converging lens in the traveling direction of the laser beam, that is, by replacing the converging lens and the concave lens with another converging lens and another concave lens that have different curvatures, the positional relationship between the focal position of the laser beam and the position where the intensity distribution of the laser beam becomes a caldera-like shape can be readily adjusted.

A laser processing apparatus according to the present invention includes a laser oscillator that emits a laser beam; the aforementioned laser processing head that receives the laser beam emitted by the laser oscillator; and a stage on which a workpiece is placed and that moves relatively to the laser processing head.

An optical system of a laser processing apparatus, which processes a workpiece by using a laser beam emitted by a laser oscillator, according to the present invention includes focusing unit for inverting a central area of the laser beam to a peripheral area thereof at a position of the workpiece and inverting the peripheral area of the laser beam to the central area at the position of the workpiece by utilizing spherical aberration of at least one of a spherical lens and an aspherical lens capable of generating spherical aberration, and for focusing the laser beam into a circular shape.

According to the present invention, the focusing unit inverts the central area of the laser beam to the peripheral area at the position of the workpiece and inverts the peripheral area of the laser beam to the central area at the position of the workpiece by utilizing the spherical aberration of at least one of the spherical lens and the aspherical lens, and also focuses the laser beam into a circular shape.

The laser beam after undergoing the inversion is used for processing the workpiece. Generally, a laser beam has higher quality, that is, higher linearity, in the central area thereof than in the peripheral area thereof. Therefore, the peripheral area of the laser beam after undergoing the inversion has high linearity. Consequently, by adjusting the converging position for each of the central area and the peripheral area, the distance (focal depth) over which the beam diameter can be maintained is extended, thereby allowing for high-quality processing of a thick workpiece.

Accordingly, in the present invention, an inversion is performed on the laser beam by utilizing the spherical aberration of at least one of the spherical lens and the aspherical lens. Consequently, with a simple configuration, a laser beam whose inner area and outer area are inverted at the position of the workpiece can be generated, and the processing direction for processing the workpiece is not limited.

A laser processing method according to the present invention includes emitting a laser beam to be used for processing a workpiece from a laser oscillator; using at least one of a spherical lens and an aspherical lens capable of generating spherical aberration, which are provided for converging the emitted laser beam, to cause an intensity distribution thereof to have a caldera-like shape, in which the intensity of the laser beam is higher in a peripheral area than in a central area, at a position of the workpiece, and radiating the laser beam whose focal position is displaced from the position of the workpiece; and processing the workpiece while moving the radiated laser beam and the workpiece relatively to each other.

A laser focusing method according to the present invention is performed in a laser processing apparatus that processes a workpiece by using a laser beam emitted by a laser oscillator. The laser focusing method includes inverting a central area of the laser beam to a peripheral area thereof at a position of the workpiece and inverting the peripheral area of the laser beam to the central area at the position of the workpiece by utilizing spherical aberration of at least one of a spherical lens and an aspherical lens capable of generating spherical aberration, and focusing the laser beam into a circular shape.

The present invention is advantageous in that a laser beam whose inner area and outer area are inverted at the position of a workpiece can be generated with a simple configuration and that the processing direction for processing the workpiece is not limited.

BRIEF DESCRIPTION OF DRAWINGS

FIG. 6 schematically illustrates the intensity distribution of the laser beam at the position of the workpiece in accordance with the embodiment of the present invention and includes diagram (A) corresponding to a case where the intensity distribution has a ring shape, diagram (B) corresponding to a case where the intensity distribution has a non-ring shape, and diagram (C) corresponding to a case where a central area has a peak.

FIG. 7 illustrates cut surfaces of the workpiece and includes diagram (A) illustrating a cut surface of the workpiece obtained by using the laser beam before an inversion is performed thereon, and diagram (B) illustrating a cut surface of the workpiece obtained by using the laser beam after undergoing the inversion in the laser cutting apparatus according to the embodiment.

DESCRIPTION OF EMBODIMENTS

An embodiment of a laser cutting apparatus and a laser cutting method according to the present invention will be described below with reference to the drawings. In this embodiment, a laser processing apparatus according to the present invention will be described by way of a laser cutting apparatus that cuts a workpiece.

Figure 1:
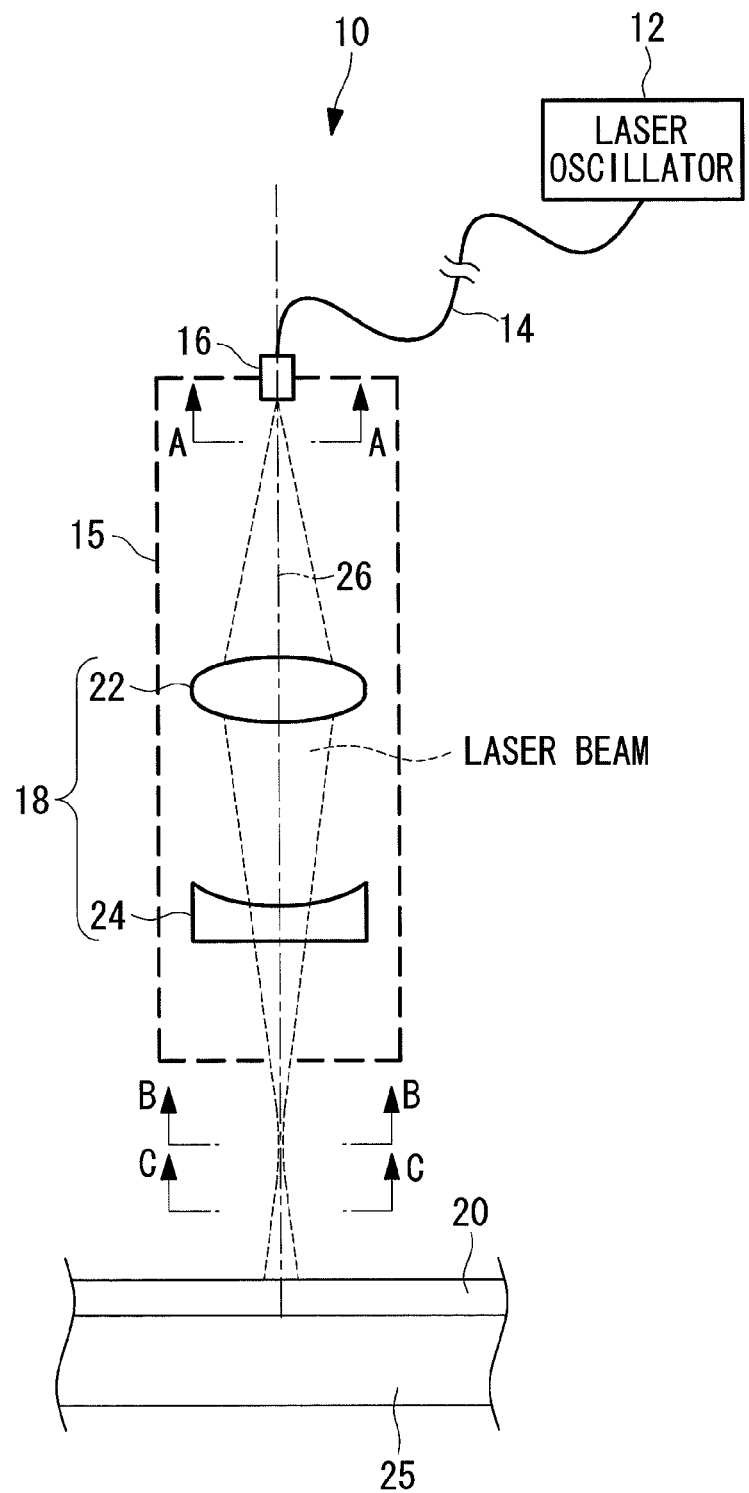
FIG. 1 schematically illustrates the configuration of an optical system of a laser cutting apparatus according to an embodiment of the present invention.

FIG. 1 illustrates the configuration of an optical system of a laser cutting apparatus 10 according to this embodiment.

The laser cutting apparatus 10 includes a laser oscillator 12, an optical fiber 14, a laser processing head 15, and a stage 25. In the laser cutting apparatus 10 according to this embodiment, a solid-state laser is used as the laser oscillator 12.

The stage 25 is a stage on which a workpiece 20 is placed and moves relatively to the laser processing head 15. The stage 25 is, for example, a so-called X-Y stage that is movable in planar directions (X and Y directions) relative to the laser processing head 15. Thus, the laser cutting apparatus 10 moves the workpiece 20 or the laser processing head 15 while continuously radiating a laser beam toward the workpiece 20, thereby cutting the workpiece 20.

The workpiece 20 is composed of metal. In this embodiment, the workpiece 20 is composed of, for example, carbon steel. The workpiece 20 has a thickness of, for example, several millimeters (for example, 6 mm to 300 mm, particularly, 15 mm to 300 mm). When cutting the workpiece 20, the laser cutting apparatus 10 according to this embodiment cuts the workpiece 20 while blowing oxygen gas serving as assist gas to a cutting area thereof.

The laser oscillator 12 generates a laser beam (i.e., a fiber laser beam in this embodiment). The laser beam generated by the laser oscillator 12 is transmitted through the optical fiber 14.

The laser processing head 15 includes a laser input section 16 and an optical system 18. The laser input section 16 is connected to an end of the optical fiber 14 and outputs the laser beam transmitted through the optical fiber 14 to the optical system 18.

The optical system 18 is constituted of spherical lenses. The spherical lenses include a convex converging lens 22 located upstream in the traveling direction of the laser beam and a concave lens 24 located downstream of the converging lens 22 in the traveling direction of the laser beam. The converging lens 22 and the concave lens 24 are coaxially disposed on a central axis 26.

The converging lens 22 converges the laser beam, which has a predetermined spreading angle (i.e., numerical aperture NA=sin θ), output from the optical fiber 14. The converging lens 22 may be constituted of a single lens or may be constituted of a plurality of lenses. Furthermore, the converging lens 22 may collimate the laser beam output from the optical fiber 14.

Figure 2:
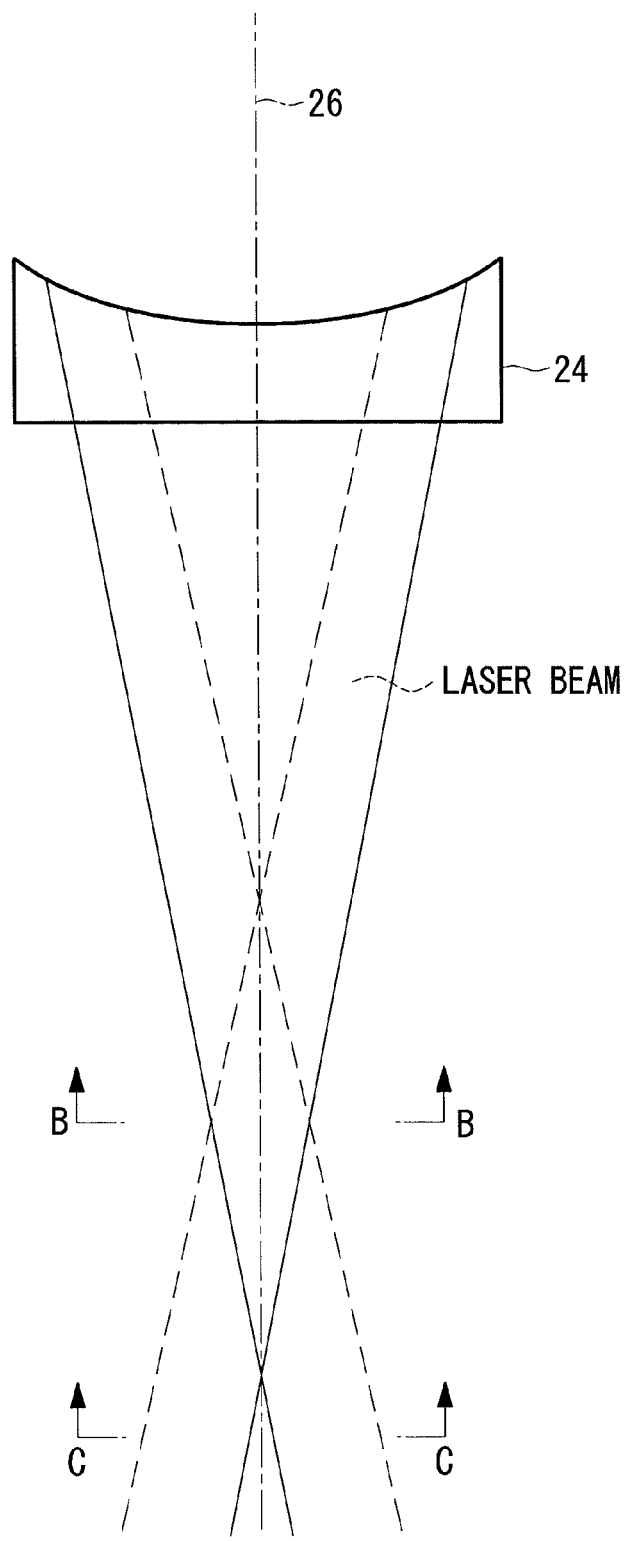
FIG. 2 illustrates the optical trajectory of a laser beam after passing through a concave lens in the laser cutting apparatus according to the embodiment of the present invention.

FIG. 2 illustrates an example of the optical trajectory of the laser beam after passing through the concave lens 24 in the laser cutting apparatus 10 according to this embodiment. The concave lens 24 has curvature at the upstream side thereof in the traveling direction of the laser beam, but has no curvature at the downstream side thereof.

As shown in the example in FIG. 2, the converging position of a laser beam (denoted by solid lines in FIG. 2) incident at the outer side of the concave lens 24 is located downstream of the converging position of a laser beam (denoted by dashed lines in FIG. 2) incident at the inner side of the concave lens 24. Specifically, the concave lens 24 radiates a laser beam onto the surface of the workpiece 20 while converging and spreading the laser beam to different positions depending on where the laser beam is input.

As shown in FIG. 2, after passing through the concave lens 24, the laser beam spreads from the downstream side of the focal position (i.e., position B) of the entire laser beam. At the downstream side of the focal position (i.e., the workpiece 20 side), the laser beam (denoted by dashed lines in FIG. 2) that was originally in the central area is inverted to a peripheral area and the laser beam (denoted by solid lines in FIG. 2) that was originally in the peripheral area is inverted to the central area due to spherical aberration of the concave lens 24, which is a spherical lens. Moreover, the concave lens 24 focuses the laser beam into a circular shape. Specifically, in the laser cutting apparatus 10 according to this embodiment, the concave lens 24 is disposed at the final stage of the optical system 18, and the laser-beam inversion is performed between the final stage of the optical system 18 and the workpiece.

Figure 3:
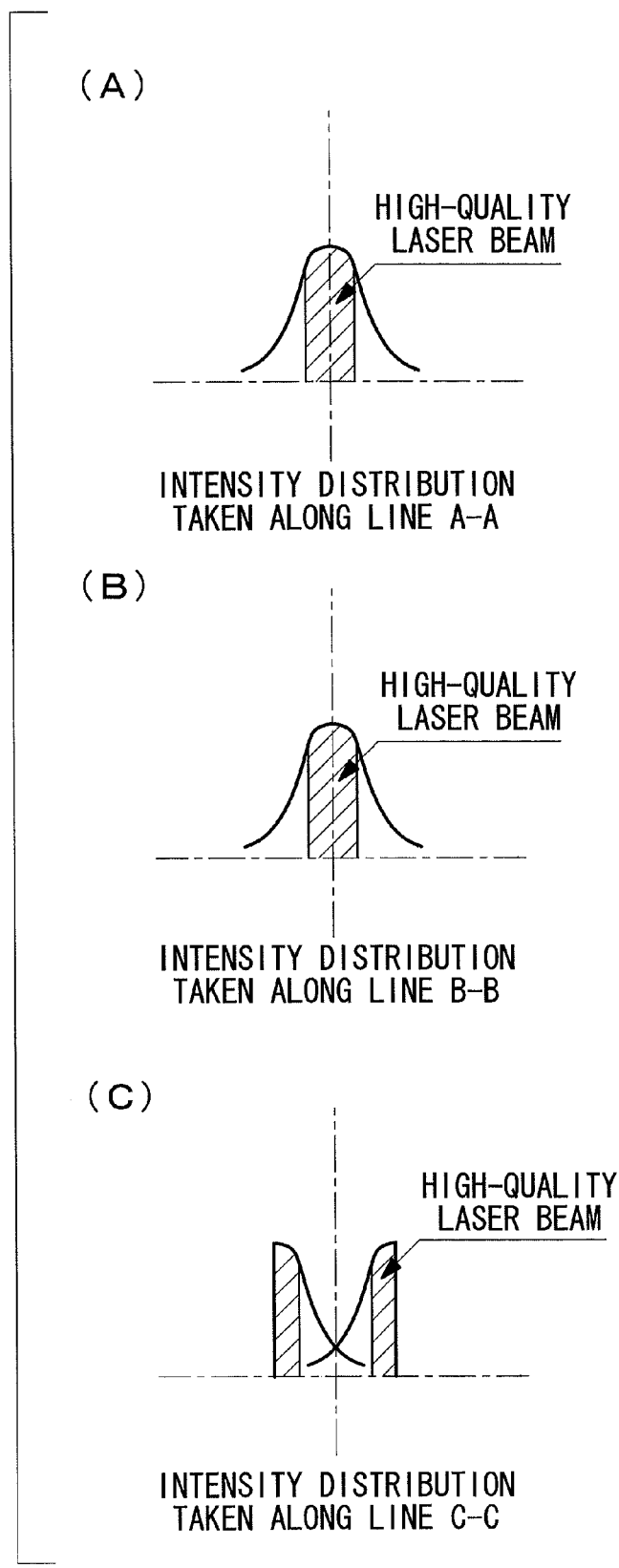
FIG. 3 schematically illustrates the intensity distribution at different positions of the laser beam output from the laser cutting apparatus according to the embodiment of the present invention and includes diagram (A) illustrating the intensity distribution of the laser beam at a position immediately after it is output from a laser input section, diagram (B) illustrating the intensity distribution of the laser beam at a focal position, and diagram (C) illustrating the intensity distribution of the laser beam at a workpiece side of the focal position.

FIG. 3 schematically illustrates the intensity distribution at different positions of the laser beam output from the laser cutting apparatus 10 according to this embodiment.

FIG. 3(A) illustrates the intensity distribution of the laser beam at a position immediately after it is output from the laser input section 16 (i.e., position A in FIG. 1). FIG. 3(B) illustrates the intensity distribution of the laser beam at the focal position (i.e., position B in FIGS. 1 and 2).

As shown in FIGS. 3(A) and 3(B), the quality of the laser beam is higher (i.e., the linearity thereof is higher) in the central area of the laser beam than in the peripheral area. In other words, the quality of the laser beam in the peripheral area is lower than that in the central area. If the workpiece 20 were to be cut by using such a laser beam, the low-quality laser beam in the peripheral area would come into contact with the cut edges of the workpiece 20, thus affecting the cutting quality (such as the cutting precision and the roughness).

On the other hand, FIG. 3(C) illustrates the intensity distribution of the laser beam at the workpiece 20 side of the focal position (i.e., position C in FIGS. 1 and 2).

As described above, due to the effect of the concave lens 24, the laser beam that was originally in the central area is inverted to the peripheral area, and the laser beam that was originally in the peripheral area is inverted to the central area, and moreover, the laser beam is focused into a circular shape. Therefore, as shown in FIG. 3(C), a high-quality laser beam, that is, a laser beam that can maintain its beam diameter over a long distance (focal depth) due to having high linearity, is located in the peripheral area.

Accordingly, in order to obtain a caldera-like shape for the intensity distribution, the central area and the peripheral area of the laser beam are inverted due to the spherical aberration of the spherical lens. In order to perform the inversion, the focal position of the laser beam needs to be displaced from the position of the workpiece 20.

In the laser cutting apparatus 10 according to this embodiment, the diameter of the laser beam at the position of the workpiece 20 ranges between 0.1 mm and 2.0 mm.

Figure 4:
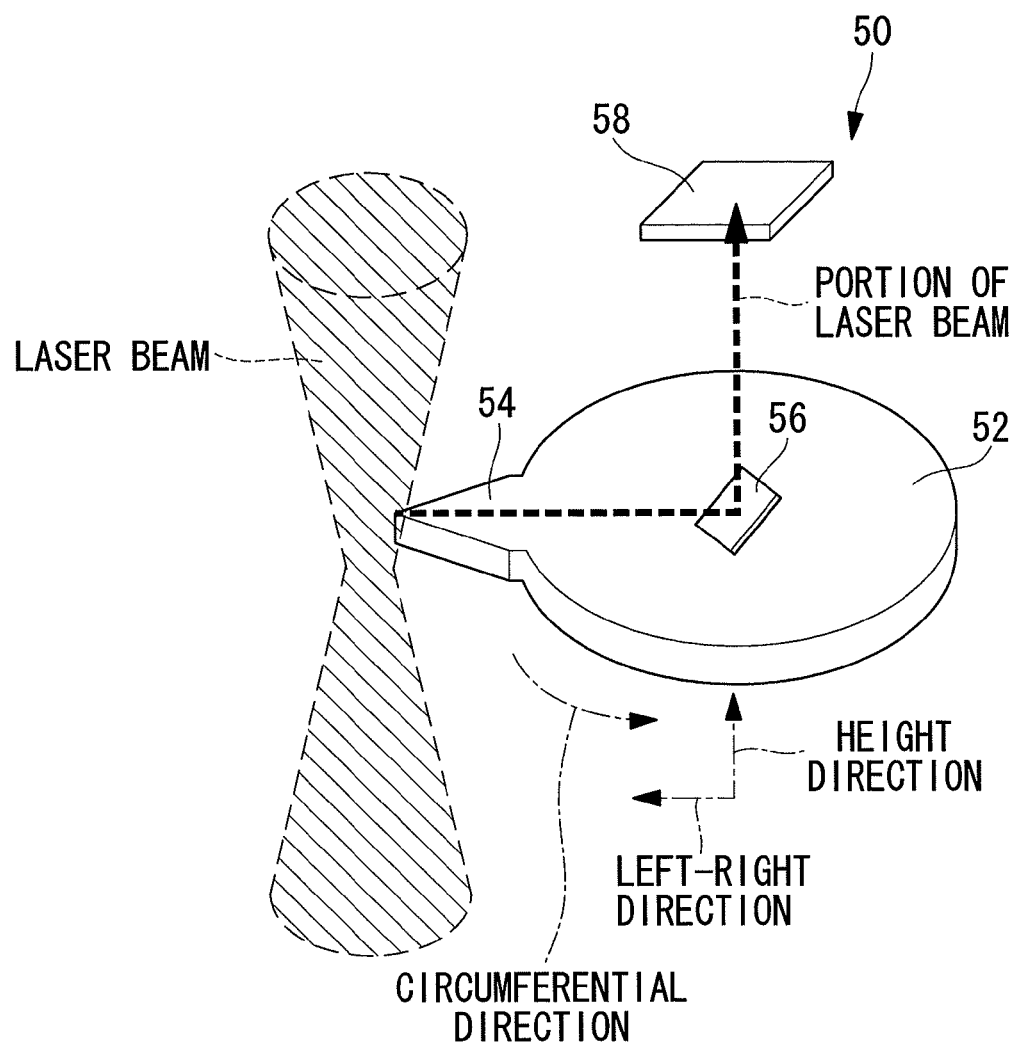
FIG. 4 illustrates the configuration of an intensity-distribution measuring device according to the embodiment of the present invention that measures the intensity distribution of the laser beam.

FIG. 4 illustrates the configuration of an intensity-distribution measuring device 50 that measures the intensity distribution of the laser beam.

In the intensity-distribution measuring device 50, a part of a circular main unit 52 is provided with a scanning section 54 that scans the laser beam. The scanning section 54 comes into contact with the laser beam and guides a portion of the laser beam, via a mirror 56, to a photodetector (photodiode) 58 provided above the main unit 52. The photodetector 58 outputs the intensity of the detected laser beam.

The main unit 52 is rotatable in the circumferential direction thereof and is movable in the height direction and the left-right direction, which intersects the laser beam. The main unit 52 rotates and moves in this manner so as to make the scanning section 54 scan the laser beam.

The steepness of the side surface of the intensity distribution of the laser beam output from the laser cutting apparatus 10 according to this embodiment is higher in the laser beam having the caldera-like shape than in the laser beam prior to having the caldera-like shape. In detail, it is desirable that the steepness be set such that the tangential angle of the side surface is 10% or more higher, preferably, 20% or more higher. Accordingly, a laser beam with higher quality is located at the side surface, thereby allowing for higher quality processing.

Figure 5:
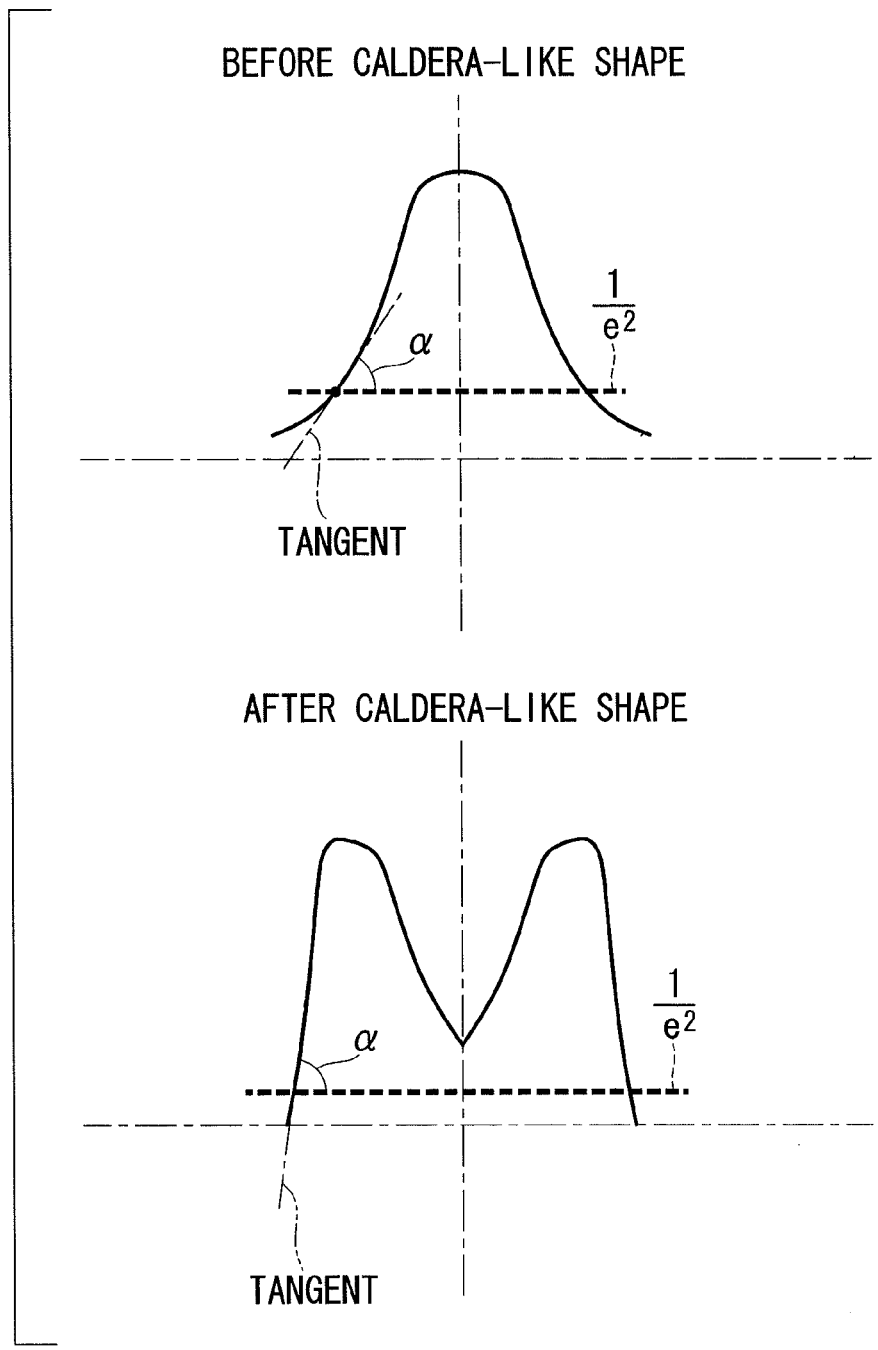
FIG. 5 schematically illustrates the steepness of a side surface of the laser beam in accordance with the embodiment of the present invention.

For example, as shown in FIG. 5, the steepness is calculated by comparing tangential angles α of the laser beam before it exhibits a caldera-like shape and the laser beam after it exhibits a caldera-like shape, a tangetial angle α being observed at an intersecting point of a line which is defined as $1/e^2$ (e being the base of natural logarithm, e=2.71828) of the peak of the intensity distribution of the laser beam and a side surface of the intensity distribution of the laser beam.

FIG. 6 schematically illustrates the intensity distribution of the laser beam used in the laser cutting apparatus 10 at the position of the workpiece 20.

FIG. 6(A) illustrates a case where the caldera-shaped intensity distribution of the laser beam obtained by the aforementioned inversion is formed substantially into a ring shape. The term "ring shape" refers to a state where the intensity of the laser beam is higher in the peripheral area than in the central area, and the intensity in the central area is extremely low. By forming the intensity distribution of the laser beam into a ring shape, a laser beam with high quality in the peripheral area and having a large focal depth at the position of the workpiece is formed, thereby allowing for particularly high-quality cutting of a thick plate.

The focal depth is preferably set as large as possible while the energy density is maintained at a value required for cutting the workpiece 20. Specifically, by setting the focal depth of the laser beam to 1 mm or more, the energy density within the thickness of the workpiece 20 can be prevented from decreasing, thereby allowing for higher quality processing.

FIG. 6(B) illustrates a case where the intensity distribution of the laser beam obtained by the aforementioned inversion is formed into a non-ring shape. The term "non-ring shape" is, for example, a circular shape with high intensity in both the peripheral area and the central area and refers to a state where the intensity distribution of the laser beam after undergoing the inversion is more uniform as compared with that having a ring shape.

Even in this case, the quality of the laser beam in the peripheral area is higher than that of a laser beam obtained by a converging lens in the related art that performs aberration correction without performing the aforementioned inversion, thereby allowing for high-quality cutting of a workpiece.

FIG. 6(C) illustrates a case where the intensity distribution of the laser beam has an additional peak in the central area of the intensity distribution at the position of the workpiece 20. In this case, since the intensity distribution has a peak in the central area, a larger amount of heat is applied to molten metal so that the temperature of the molten metal can be sufficiently increased, thereby allowing for cutting of a thick workpiece 20. The intensity at the peak in the central area may be higher than or lower than the intensity of the peak in the peripheral area.

The intensity distribution of the laser beam after undergoing the inversion can be formed into various shapes, as shown in FIG. 6, by adjusting, for example, the distance between the laser input section 16 and the optical system 18, the distance between the converging lens 22 and the concave lens 24, the number of lenses in the converging lens 22, and the positional relationship between the converging lens 22 and the concave lens 24, that is, by adjusting the combination of the converging lens 22 and the concave lens 24 constituting the optical system 18.

FIG. 7 illustrates cut surfaces of the workpiece 20.

FIG. 7(A) illustrates a cut surface of the workpiece 20 obtained by using a laser beam before the inversion is performed thereon. Diagrams shown in the midsection and the lower section of FIG. 7(A) illustrate the intensity distribution of the laser beam used for the cutting, where the laser beam has a peak in the central area. A diagram shown in the upper section of FIG. 7(A) is a photograph of the actual cut surface.

On the other hand, FIG. 7(B) illustrates a cut surface of the workpiece 20 obtained by using a laser beam after undergoing the inversion in the laser cutting apparatus 10 according to this embodiment. Diagrams shown in the midsection and the lower section of FIG. 7(B) illustrate the intensity distribution of the laser beam used for the cutting. The intensity distribution of the laser beam has a caldera-like shape and has a peak in the central area. A diagram shown in the upper section of FIG. 7(B) is a photograph of the actual cut surface.

By comparing the photographs in FIG. 7(A) and FIG. 7(B), it is obvious that the cut surface shown in FIG. 7(B) obtained by using the laser beam after undergoing the inversion is cut more smoothly.

By changing the curvature of at least one of the convex converging lens 22 and the concave lens 24, the positional relationship between the focal position of the laser beam and the position where the intensity distribution of the laser beam becomes a caldera-like shape, that is, a position where the inversion is performed, can be adjusted.

Figure 8:
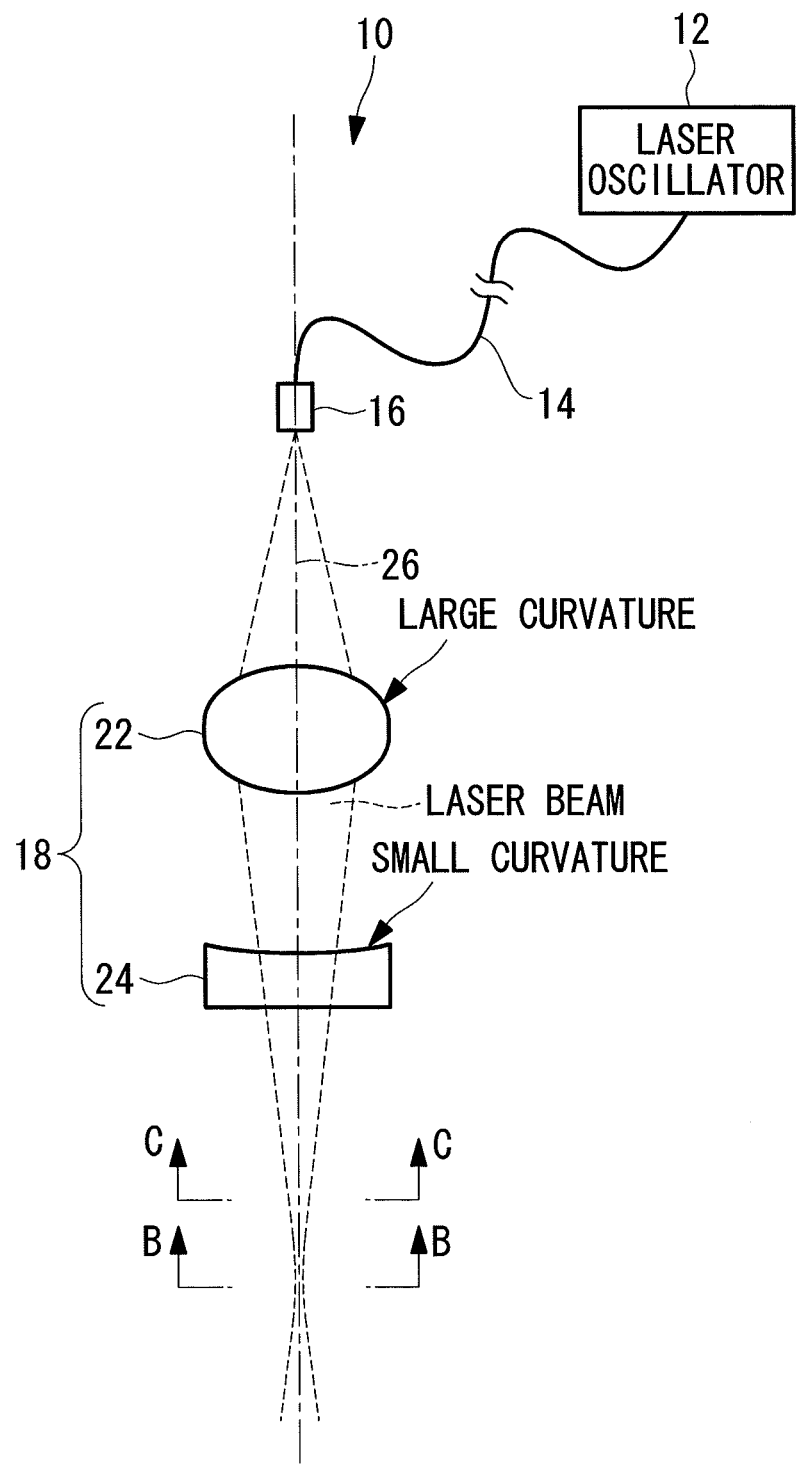
FIG. 8 illustrates how the positional relationship between the focal position of the laser beam and a position where the intensity distribution of the laser beam becomes a caldera-like shape is adjusted in accordance with the embodiment of the present invention.

For example, as shown in FIG. 8, if the inversion is to be performed at the upstream side ("C-C" in FIG. 8) of the focal position ("B-B" in FIG. 8), the curvature of the converging lens 22 is increased, and the curvature of the concave lens 24 is reduced. On the other hand, if the inversion is to be performed at the downstream side of the focal position, the curvature of the converging lens 22 is reduced, and the curvature of the concave lens 24 is increased.

Changing the curvature of the converging lens 22 and the curvature of the concave lens 24 means replacing the converging lens 22 and the concave lens 24 with another converging lens 22 and another concave lens 24 that have different curvatures. Accordingly, in the laser cutting apparatus 10 according to this embodiment, the positional relationship between the focal position of the laser beam and the position where the intensity distribution of the laser beam becomes a caldera-like shape can be readily adjusted.

Figure 9:
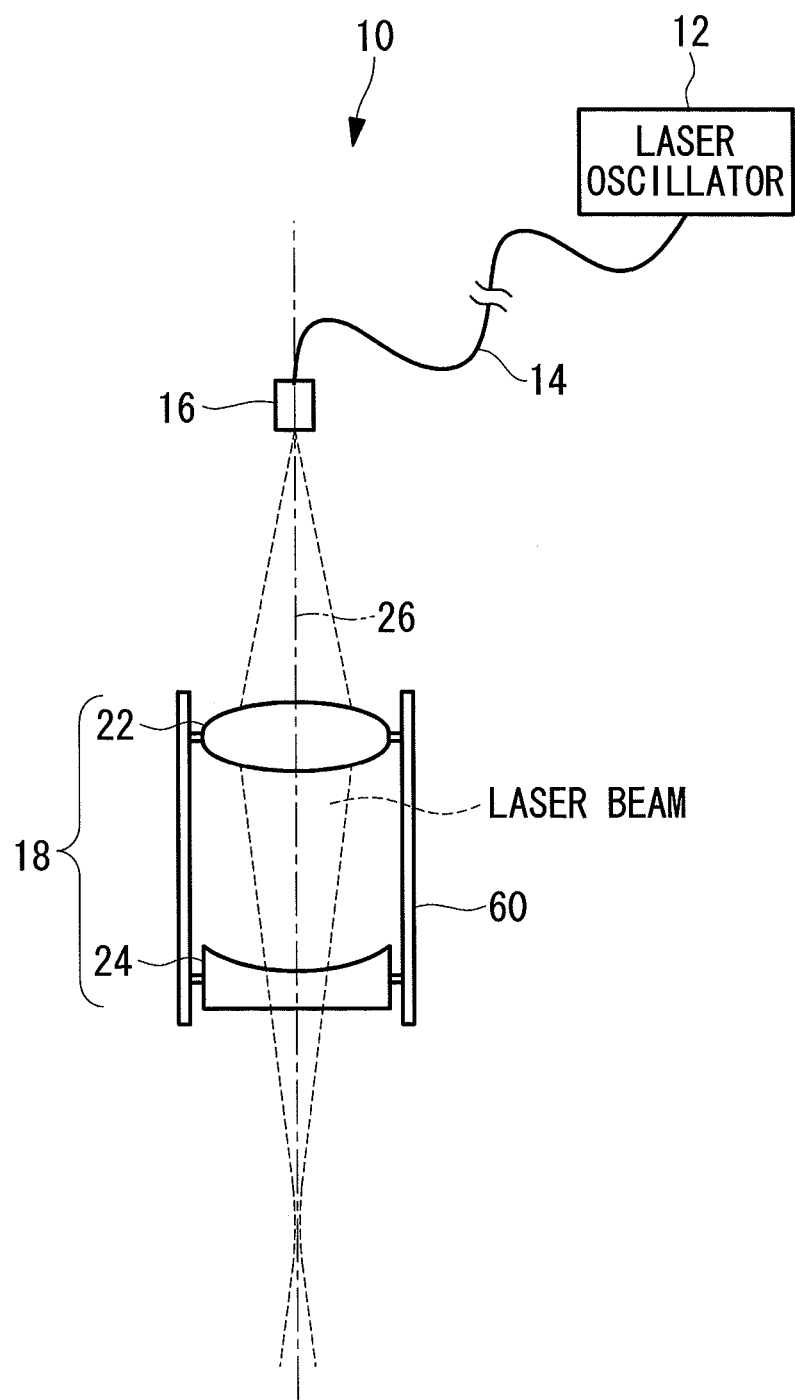
FIG. 9 illustrates a configuration in which lenses in the laser cutting apparatus according to the embodiment of the present invention are combined into a lens unit.

As an alternative to the first embodiment in which the converging lens 22 and the concave lens 24 are described as being different lenses, for example, these lenses may be combined into a lens unit 60, as shown in FIG. 9. In this case, the position where the inversion is performed may be adjusted by replacing the lens unit 60 with another lens unit 60 having different curvature.

As described above, the laser cutting apparatus 10 according to this embodiment performs an inversion on a laser beam by utilizing spherical aberration of a spherical lens and focuses the laser beam into a circular shape. Consequently, with a simple configuration, a laser beam whose inner area and outer area are inverted at the position of a workpiece can be generated, and the processing direction for processing the workpiece is not limited.

Although the present invention has been described with reference to the above embodiment, the technical scope of the invention is not limited to the scope described in the above embodiment. Various alterations or modifications may be made in the above embodiment without departing from the scope of the invention, and embodiments with such alterations or modifications are included in the technical scope of the invention.

For example, although oxygen gas is used as assist gas in the above embodiment, the present invention is not limited to this; nitrogen gas, argon gas, or other gases may be used as the assist gas.

Furthermore, although a fiber laser beam is used in the laser cutting apparatus 10 in the above embodiment, the present invention is not limited to this. For example, other kinds of laser beams, such as a YAG laser beam or a disk laser beam (with a wavelength ranging between 1.05 μm and 1.09 μm) transmitted through an optical fiber, or a $CO_2$ laser beam, which is a gas laser beam, may be used.

Furthermore, although the intensity distribution of a laser beam is formed into a caldera-like shape by using a spherical lens in the above embodiment, the present invention is not limited to this. Alternatively, the intensity distribution of a laser beam may be formed into a caldera-like shape by using an aspherical lens that has not sufficiently undergone aberration correction (i.e., that is capable of generating spherical aberration). As a further alternative, the intensity distribution of a laser beam may be formed into a caldera-like shape by using a combination of a spherical lens and the aforementioned aspherical lens.

REFERENCE SIGNS LIST 10 laser cutting apparatus
12 laser oscillator
15 laser processing head
16 laser input section
18 optical system
20 workpiece
22 converging lens 24 concave lens
25 stage

The invention claimed is:

1. An optical system for a laser processing apparatus that processes a workpiece by using a laser beam emitted by a laser oscillator, the optical system comprising:
a focusing unit that includes a converging lens located in a traveling direction of the laser beam and a concave lens located downstream of the converging lens in the traveling direction of the laser beam, and that is configured to focus the laser beam into a circular shape,
wherein the focal position of the laser beam is displaced from the position of the workpiece,
wherein a central area of the laser beam is inverted to a peripheral area thereof at a position of the workpiece and the peripheral area of the laser beam is inverted to the central area at the position of the workpiece by utilizing spherical aberration of the concave lens, and
wherein intensity distribution of the laser beam has a shape, in which the intensity of the laser beam is higher in a peripheral area than in a central area, at a position of the workpiece.

2. A laser processing head for a laser processing apparatus that processes a workpiece by irradiating the workpiece with a laser beam, the laser processing head comprising the optical system according to claim 1.

3. The laser processing head according to claim 2, wherein the intensity distribution of the laser beam at the position of the workpiece is ring-shaped.

4. The laser processing head according to claim 2, wherein the intensity distribution of the laser beam at the position of the workpiece is non-ring-shaped.

5. The laser processing head according to claim 4, wherein the intensity distribution of the laser beam at the position of the workpiece has a peak in the central area.

6. The laser processing head according to claim 2, wherein the laser beam has a focal depth of 1 mm or more at the position of the workpiece.

7. The laser processing head according to claims 2, wherein the steepness of a side surface of the intensity distribution of the laser beam is 10% or more higher in the laser beam when having the shape than in the laser beam prior to having the shape.

8. The laser processing head according to claims 2, wherein a positional relationship between the focal position of the laser beam and a position where the intensity distribution of the laser beam becomes the shape is adjustable by changing at least one of the curvature of the converging lens and the curvature of the concave lens.

9. A laser processing apparatus comprising:
a laser oscillator that emits a laser beam;
the laser processing head according to claim 2, which receives the laser beam emitted by the laser oscillator; and
a stage on which a workpiece is placed and that moves relative to the laser processing head.

10. A laser focusing method for a laser processing apparatus that processes a workpiece by using a laser beam emitted by a laser oscillator, the laser focusing method comprising:
providing a converging lens in a traveling direction of the laser beam and a concave lens downstream of the converging lens in the traveling direction of the laser beam so that the focal position of the laser beam is displaced from the position of the workpeice and so that the laser beam is focused into a circular shape; and
inverting a central area of the laser beam to a peripheral area thereof at a position of the workpiece and inverting the peripheral area of the laser beam to the central area at the position of the workpiece by utilizing spherical aberration of the concave lens.

11. A laser processing method of processing a workpiece by irradiating the workpiece with a laser beam focused by using the laser focusing method according to claim 10.

* * * * *